Patented Sept. 4, 1945

2,384,323

UNITED STATES PATENT OFFICE 2,384,323

ALIPHATIC-ETHER-ALCOHOL DERIVATIVES OF CASHEW NUT SHELL OIL

Rush F. McCleary, Beacon, N. Y., assignor to The Texas Company, New York, N. Y., a corporation of Delaware No Drawing. Application March 26, 1943, Serial No. 480,681

5 Claims. (Cl. 260—613)

The present invention relates to a composition of matter and particularly to the aliphatic-ether alcohol and alcoholate derivatives of phenolic compositions obtained or derived from certain naturally-occurring oils.

The compounds or compositions of the present invention are prepared from the phenolic compositions present in or derived from the oils extracted from the Anacardium genus of the Anacardiaceae family. The oils included within this classification are the oils and liquids commonly referred to as cashew nut shell oil, marking nut shell oil, Japanese lac, etc., whose chemical composition depends upon the particular method of extraction used. It is the consensus of the authorities on these extracted oils and liquids that the chemical composition of the naturally-occurring oils consists primarily of various types of aromatic derivatives, such as anacardic acid ($C_{22}H_{32}O_3$), cardol ($C_{32}H_{52}O_4$), cardanol ($C_{20}H_{32}O$), anacardol ($C_{18}H_{30}O$), urushiol ($C_{20}H_{30}O_2$), etc. These aromatic derivatives, and the other aromatic derivatives which may be present in or derived from the oils which have not been isolated, are very unstable and in the presence of heat form decomposition products or oil-insoluble polymerization products.

For the purposes of this invention, one of these naturally-occurring oils, namely, cashew nut shell oil, will be used as illustrating the types of derivatives and reactions representative of the components of the oils falling within this natural classification. Cashew nut shell oil, when obtained by solvent extraction, consists primarily of 90% anacardic acid and 10% cardol. The anacardic acid portion of this solvent-extracted oil, which is described as a salicylic acid homolog, decomposes at slightly elevated temperatures with the evolution of carbon dioxide to yield cardanol, which is a phenol containing an unsaturated alkyl radical ($C_{14}H_{27}$) in the meta position. This decomposition is particularly noticed in the cashew nut shell oil obtained by a thermal extraction process which contains varying amounts of anacardic acid, usually around 16%, with the balance made up of a major proportion of cardanol and a minor proportion of cardol.

It has been found that certain derivatives of these phenolic compositions present in or derived from the oils extracted from the Anacardium genus of the Anacardiaceae family, when incorporated in a lubricating composition, impart enhanced detergent properties thereto. The derivatives of these phenolic compositions with which the present invention is concerned are the aliphatic-ether-alcohol and the aliphatic-ether-alcohol derivatives of these phenolic compositions.

In referring to the "phenolic compositions present in or derived from the oils extracted from the Anacardium genus of the Anacardiaceae family," it is to be understood that such a classification includes all those aromatic derivatives obtained from these oils which possess at least one hydroxyl group attached to the aromatic nucleus irrespective of the presence of other oxygen-containing radicals, which may also be attached to the nucleus together with mixtures thereof.

The aliphatic-ether alcohol derivatives of these phenolic compositions are those in which a hydroxyl or sulfhydryl radical is displaced from the aromatic nucleus of the phenolic composition by means of an aliphatic radical linked to the aromatic nucleus through an ether linkage at the position of one or more of the original hydroxyl groups. The displaced hydroxyl or sulfhydryl radical may remain as such in the final product or the replaceable hydrogen thereof may be replaced by a metal to form the metal alcoholate derivative.

The compounds of the present invention may be described as those derivatives of the phenolic compositions present in or derived from the Anacardium genus of the Anacardiaceae family which possesses the following general formula $$A((RX)_aY)_n$$

in which A is a phenoxy radical derived from the phenolic compositions present in or derived from the oils extracted from the Anacardium genus of the Anacardiaceae family, R is an aliphatic radical, X may be either oxygen or sulfur, Y may be either hydrogen or a metal, and $a$ and $n$ are integers of one or more. The value of $n$ may be varied in accordance with the number of hydroxyl radicals present on the nucleus of the phenolic composition. The value of $a$ is preferably within the range of from 1 to 10. The radical R, although referring broadly to any aliphatic radical, is preferably one containing from 1 to 10 carbon atoms which may contain such substituents as halogen, amino, nitro, sulfur, etc., radicals attached thereto. The symbol Y designates the replaceable hydrogen of the aliphatic-ether-alcohol derivative or the presence of a metal, as in the aliphatic-ether-alcoholate derivative, which metal has one valence thereof attached to the constituent X of the formula. The metals contemplated within the designation of Y may be any of the following metals, such as lithium, sodium, potassium, calcium, barium, strontium, magnesium, zinc, iron, cadmium, nickel, manganese, tin, mercury, copper, aluminum, lead, etc., with particular preference given to the alkaline earth metals.

In view of the fact that the phenoxy radical A is derived from the phenolic compositions of the Anacardium oils which are extremely unstable and susceptible to polymerization and condensation reactions, it may be preferable to first stabilize these compositions before proceeding in the preparation of the derivatives of the present invention. Such stabilizing processes include partial hydrogenation or addition reactions which render the unsaturated alkyl constituents of these compositions less reactive and may, in effect, enhance the improving properties of the final product as an addition agent. It is therefore to be understood that the scope of the invention includes the stabilized as well as the unstabilized phenolic compositions when reference is made to these phenolic compositions or the phenoxy radical A.

Another factor to be considered in the interpretation of the scope of the invention is that when reference is made to the aliphatic-ether-alcohol and alcoholate derivatives, such nomenclature is intended to include the derivatives in which the alcohol or alcoholate portion thereof is replaced by a sulfhydryl radical or the metal salts of such compounds.

In preparing the compounds of the present invention any of the classical methods of synthesis may be used. The particular method chosen depends upon the conditions of reaction and the stability of the phenolic composition. It is preferable to select a method of preparation which is carried out at low temperatures and which either does not yield acidic by-products or in which the acidic by-products are removed from the reaction zone. These conditions of reaction, however, may be modified if the starting material has been stabilized by partial hydrogenation or addition reactions, such as a halogenation or sulfurization reaction.

For purposes of illustration a few of the generally-accepted methods of synthesis which may be used in the preparation of these derivatives will be presented by means of empirical reactions. In these reactions the symbol AH will be used to designate the phenolic composition obtained from the Anacardium oils in which A is the phenoxy radical previously described.

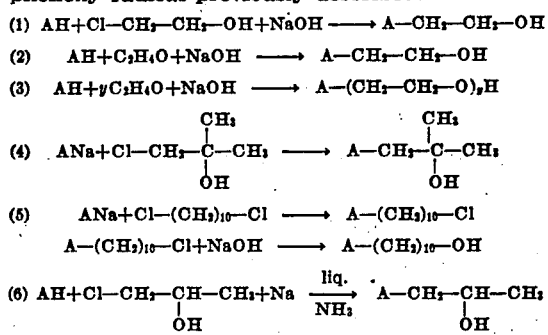

The methods of preparing the metal salts or alcoholates will vary in accordance with the particular metal alcoholate desired. The following empirical reactions will illustrate some of the methods of preparation. In these reactions the formula $AR_1OH$ is used to designate the aliphatic-ether-alcohol derivatives previously described:

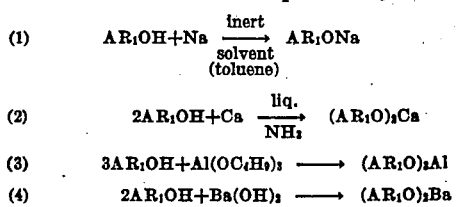

The following specific examples illustrate the foregoing methods of preparing the compounds of the present invention:

*Example I*

46 grams of sodium were dissolved in two liters of liquid ammonia. To this solution was then added a toluene solution of 510 grams of cardanol with vigorous agitation. The resulting solution possessed a yellow color and 15 grams of additional sodium were added. Thereafter, one liter of toluene was added to the solution of the resulting sodium cardanate, and 210 grams of ethylene chlorhydrin were added to the solution. After standing over night at room temperature to allow the ammonia to evaporate, the toluene solution was filtered and the solvent was then removed by heating in vacuo. The residue, a reddish brown oil weighing 600 grams, consisted of cardanoxyethanol.

*Example II*

The cardanoxyethanol, prepared in accordance with Example I, was then taken up by one liter of toluene and added to a solution of 45 grams of calcium in two liters of liquid ammonia. An additional liter of toluene was added and the ammonia allowed to evaporate. The toluene solution was then warmed and filtered. After filtering the solvent was removed by heating in vacuo and the residual calcium cardanoxyethylate was dissolved in an equal weight of 300 pale oil to form a 50% concentrate. The 50% concentrate analyzed as follows:

|  | Per cent |
|---|---|
| Ash | 5.8 |
| Calcium | 3.2 |
| Sodium | 0.55 |

*Example III*

610 grams of cardanol (bromine No. 124; neut. No. 1.28; hydroxyl No. 188); % sulfur 0.02 were dissolved in 500 ccs. of formula 30 alcohol and 120 grams of sodium hydroxide and 500 ccs. of water were added. The reaction mixture was heated at 75–80° C. with vigorous stirring to insure complete solution of the sodium hydroxide. Thereafter 260 grams of ethylene chlorhydrin were added dropwise to the mixture over a period of one hour. The agitation was continued at 75–80° C. for two hours. Some toluene was added and the oil-layer washed three times in water. 850 grams of an SAE—10 grade lubricating oil and 236 grams of anhydrous barium hydroxide were added to the washed cardanoxyethanol and the mixture heated under a reflux condenser equipped with an automatic separator until all the water and toluene were removed. The maximum reaction temperature was 225° C. The resulting product was filtered while still hot. The resulting 50% concentrate of barium cardanoxyethanol in a lubricating oil analyzed 8.88% barium.

Obviously many modifications and variations of the invention, as hereinbefore set forth, may be made without departing from the spirit and scope thereof, and therefore only such limitations should be imposed as are indicated in the appended claims.

I claim:
1. A cardanoxy alkanol.
2. A metal cardanoxy alkylate.
3. An alkaline earth metal cardanoxy alkylate.
4. Cardanoxy ethanol.
5. Calcium cardanoxy ethylate.

RUSH F. McCLEARY.